United States Patent

Wallmark

[15] 3,638,078

[45] Jan. 25, 1972

[54] VOLTAGE-RESPONSIVE CAPACITANCE DEVICE AND A METHOD OF PRODUCING SUCH A DEVICE

[72] Inventor: John Torkel Wallmark, Goteborg, Sweden

[73] Assignee: Institutet for Halvledarforskning AB, Vallingby, Sweden

[22] Filed: Oct. 16, 1970

[21] Appl. No.: 89,819

[30] Foreign Application Priority Data

Nov. 17, 1969 Sweden ....................15739/1969

[52] U.S. Cl. ....................317/234, 317/258

[51] Int. Cl. ....................H01l 3/00

[58] Field of Search ....................317/234, 231, 235, 258

[56] References Cited

UNITED STATES PATENTS

| | | | |
|---|---|---|---|
| 3,202,891 | 8/1965 | Frankl | 317/258 |
| 3,400,310 | 9/1968 | Darendorf et al. | 317/234 |
| 3,512,052 | 5/1970 | MacIver et al. | 317/234 |

*Primary Examiner*—James D. Kallam
*Attorney*—Fred C. Philpitt

[57] ABSTRACT

A voltage-responsive capacitance device comprises a body of semiconducting material of one conductivity type. On one surface of the semiconductor body an insulating layer is applied. In this layer electric charges can be permanently stored to form a barrier in the semiconductor body. By providing different nonuniform charge distributions in the insulating layer the capacitance-voltage relationship can be modified as desired. It is for instance possible to obtain a linear relationship, so that the capacitance is directly proportional to the voltage.

9 Claims, 4 Drawing Figures

PATENTED JAN 25 1972 3,638,078

VOLTAGE-RESPONSIVE CAPACITANCE DEVICE AND A METHOD OF PRODUCING SUCH A DEVICE

The present invention relates to a voltage-responsive capacitance device, so-called varactor, and a method of producing such a varactor.

Varactor diodes consisting of a semiconductor diode which is biased in the reverse of blocking direction are well known and in common use. In these diodes the capacitance varies with the voltage in a manner which is determined primarily by the doping profile in a PN-junction. At an abrupt junction, i.e., when the doping of the P-side is constant right to the junction, whereafter the N-side continues with a likewise constant doping, the capacitance is proportional to the square root of the voltage over the junction. At a junction, at which the doping of the P-side decreases linearly towards the N-side and the doping of the N-side increases linearly from the junction, the capacitance is proportional to the third root of the voltage. With other doping profiles, other voltage responses can be obtained. However, it is difficult to obtain a purely linear response, i.e., a junction wherein the capacitance is directly proportional to the voltage.

The varactor according to the present invention is not a diode but can be considered as a capacitance which is connected in series with a surface diode. Compared with a diode it does not draw any direct current. Further, it can be biased in both directions without drawing any current.

The principal object of the present invention is to produce a varactor wherein the voltage response of the capacitance can be formed optionally and, e.g., by made linear so that the capacitance is directly proportional to the voltage.

This object is attained according to the present invention by the voltage-responsive capacitance device including a body of semiconducting material of one conductivity type and an insulating layer applied on said body and permanently storing electric charges, so that a barrier layer is formed in the semiconductor body, when a voltage within the intended operating range is applied over the capacitance device, and characterized in that the insulating layer presents a nonuniform charge distribution. Such a capacitance device can be produced by a method characterized by covering a body of semiconducting material of one conductivity type with an insulating layer on one surface and permanently storing electric charges with nonuniform charge distribution in said insulating layer.

The invention will now be described with reference to the accompanying drawings.

Figure 1:
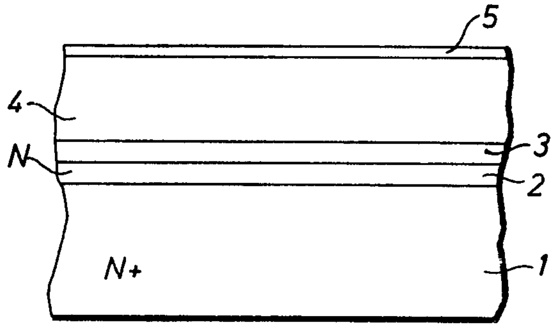
Figure 2:
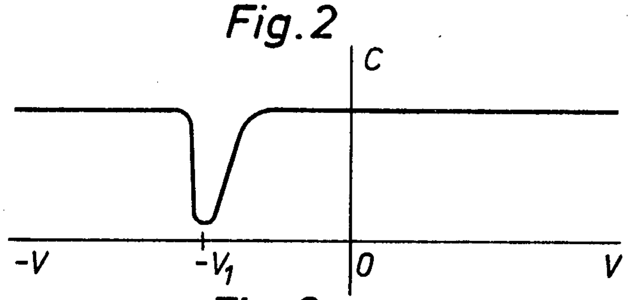
Figure 3:
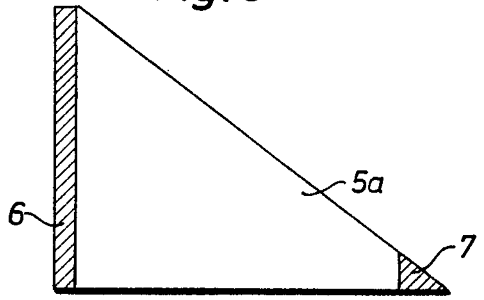
Figure 4:
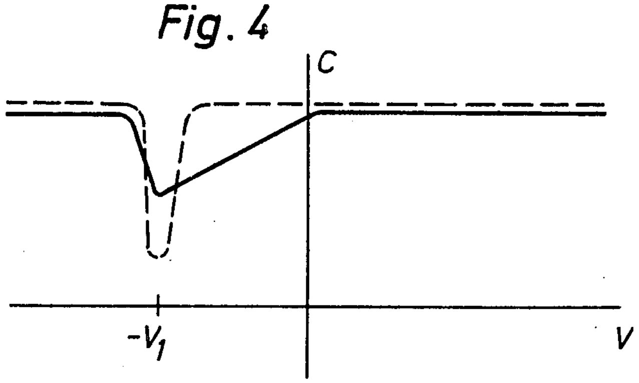

FIG. 1 shows a cross section through a varactor according to one embodiment of the invention, FIG. 2 the variation of the capacity with the voltage, FIG. 3 is a top view of a further development of the invention and FIG. 4 how the variation of the capacitance with the voltage can be given a linear course within a voltage interval.

In the production of the varactor according to FIG. 1 a thin wafer 1 of silicon is used as a starting material. This silicon wafer is relatively heavily doped ($N^+$), e.g., corresponding to 0.001 ohm/cm., so that the series resistance, which is caused by this wafer in series with the capacitance of the varactor, is relatively low. Over this wafer 1 a thin layer 2 of silicon (N) is placed having a lower doping, e.g., corresponding to 10 ohm/cm., as a layer integrated with the wafer, so that the two layers form only one single crystal. In the embodiment shown the doping is such that the silicon wafer is given an N-type conductivity. However, the doping could be such that the conductivity becomes of P-type. The surface of the silicon wafer is covered by a thin layer of silica 3 with a thickness of 10 to 35 Angstroms. Layers which are thinner than 10 Angstroms are difficult to produce, since at room temperature silicon almost immediately covers itself with such an oxide layer. However, thereafter the growth at room temperature occurs more slowly. Thicker layers can be obtained if the temperature is raised temporarily but layers thicker than 30 to 35 Angstroms are not suitable, since the probability of tunnel effect occurring in the layer is considerably reduced.

Over this silica layer is applied a silicon nitride layer 4, which is obtained by means of reaction of silane ($siH_4$, diluted with argon) with ammonia gas at 700° C. The silicon nitride layer can have a thickness of 50 to 10,000 Angstroms and preferably about 300 to 1,000 Angstroms. A thinner silicon nitride layer than 300 angstroms is difficult to obtain with an even thickness and therefore causes difficulties due to electric breakdowns. A thicker layer than 1,000 Angstroms gives a lower sensitivity of the finished component. Over the silicon nitride layer an electrically conducting contact layer 5 has been applied as a termination, e.g., consisting of aluminum with a thickness of about 500 Angstroms. The semiconductor body 1 and the contact layer 5 are preferably provided with electric connector contacts (not shown) for the application of voltages over the varactor.

If now a voltage is applied between the two connector contacts simultaneously and the capacitance therebetween is measured, the results shown in FIG. 2 are obtained. If very negative voltages are applied to the contact layer 5 in relation to the silicon wafer, the electrons are repelled from the silicon surface and simultaneously holes are attracted. If a sufficient number of holes are attracted, the conductivity in the silicon wafer will be good and the capacitance is then measured over the insulating layer. At very positive voltages holes are repelled and electrons are attracted. If a sufficient number of electrons are attracted, the conductivity in the silicon wafer again becomes good and, consequently, the capacitance is again measured over the insulating layer. For a voltage somewhere between these extreme values, e.g., at the voltage $-V_1$, the surface of the silicon wafer is depleted of charges, which means that a barrier layer is formed and the capacitance thereof will be placed in series with the capacitance of the insulating layer. The resulting capacitance of the device will then be considerably lower, which is illustrated in FIG. 2. The voltage $-V_1$ at which the capacitance minimum occurs is determined, i.e., by the charge which is stored in the insulating layer. At a positive charge in the insulating layer the voltage at minimum will be negative and vice versa. Thus, it is possible to change the voltage at which the capacitance minimum occurs by charging the insulating layer in different manners. If the insulating layer is formed by a double layer, as shown in FIG. 1, the charging of this layer can be performed by a very high voltage being applied over the insulating layer. If the silicon wafer is earth-connected, a negative voltage on the insulating layer will repel electrons, which due to a tunnel effect pass from traps in the boundary surface between the insulating layers or in the top insulating layer and pass over to the silicon wafer. Hereby a positive charge is left in these traps and the voltage for capacitance minimum is displaced towards more negative values. If instead a very high positive voltage is applied over the insulating layers, electrons will be attracted and pass over from the silicon wafer to the traps, also in this case due to the tunnel effect. Hereby a negative charge is produced in the insulating layer and the voltage for capacitance minimum is displaced towards more positive values. How far the voltage is displaced depends on the value of the charge and therefore also on the value and durability of the voltage temporarily applied.

Since the capacitance is changed with the voltage, the device can be used as a varactor. In many cases it is unimportant that the capacitance does not vary linearly with the voltage. However, in other cases it is strongly desirable that the capacitance varies directly with the voltage. This is particularly the case, when the capacitance is to be used for the tuning of a resonance circuit. By in principle connecting in parallel a number of capacitances of the type mentioned above and with the voltage response shown in FIG. 2, it is possible to influence in a simple manner the dependence of the capacitance of the voltage so that the desired capacitance-voltage curve is obtained. In particular it is possible by means of a suitable geometry and dimensioning of the parallel-connected voltage-responsive capacitances to attain a purely linear connection between the capacitance and the voltage within a certain voltage range, as illustrated in FIG. 4 by the solid curve. The dotted curve in FIG. 4 illustrates the voltage response of the capacitance according to FIG. 2 and has been drawn for comparison.

Fig. 3 shows a varactor, which is formed so that the capacitance varies purely linearly with the voltage, as illustrated in FIG. 4. FIG. 3 shows the varactor, which in principle is built up in the same manner as the one shown in FIG. 1, in a top view and provided with a resistive layer *5a* on the insulating layer. This resistive layer is provided with two terminal contacts 6 and 7 so that a voltage can be applied between the ends of the resistive layer, whereby different points on this resistive layer can be applied a different potential in relation to the silicon wafer, if a voltage is applied between the silicon wafer 1 and one of the terminal contacts 6, 7. If differentially high voltages are applied over the insulating layer, different portions of the insulating layer will be charged differently. There is then a good possibility on one hand to form the geometry of the resistive layer and on the other hand the values and the durability of the voltages in such a manner that the resulting capacitance varies linearly with the voltage within a certain range of operation.

The insulating layer can also be charged in such a manner that different charges will be located over different portions of the semiconductor wafer by first giving the insulating layer a uniform charge over the whole surface and then treating the insulating layer in such a manner that certain portions of the insulating layer are removed. Also in this manner the voltage response of the capacitance can be influenced so that a desired connection is obtained.

Instead of silicon other semiconductor materials can of course be used, e.g., germanium. It is also possible, instead of building up the insulating layer, which consists of two layers, of completely different materials, to form the first layer of thermal silica and the second layer of nonthermal silica, i.e., silica which is produced in an other manner than the ordinary thermal method. Thermal silica is namely practically free from traps, i.e., traps exist in a density $<10^{11}$cm.$^{-2}$. The top layer can also preferably be formed of alumina or other nonorganic insulator.

I claim:

1. A voltage-responsive capacitance device comprising a body of semiconducting material of one conductivity type, an insulating layer on a surface of said body permanently storing electric charges therein in a nonuniform charge distribution, a conducting contact layer on said insulating layer, and a barrier layer formed in the semiconductor body upon application of a voltage across said contact layer and semiconductor body, whereby the capacitance between the layer and body is responsive to the polarity and quantity of said voltage.

2. Capacitance device as claimed in claim 1, characterized in that the insulating layer has a varying thickness.

3. Capacitance device according to claim 1, characterized in that the insulating layer consists of two layers of different materials, the first layer next to the semiconductor body being so thin that a tunnel effect can occur, and the second layer being several times thicker than the first layer.

4. Capacitance device as claimed in claim 3, characterized in that the first layer consists of silica with a thickness of 10 to 35 Angstroms and the second layer being of an other nonorganic insulating material with a thickness of 50 to 10,000 Angstroms.

5. Capacitance device as claimed in claim 4, characterized in that the second layer consists of silicon nitride with a thickness of 300 to 1,000 Angstroms.

6. Capacitance device as claimed in claim 4, characterized in that the second layer consists of aluminia.

7. Capacitance device according to claim 1 characterized in that the semiconductor body consists of heavily doped material of one conductivity type ($N^+$) with a surface layer adjacent the insulating layer of the same conductivity type but with a less heavy doping.

8. Capacitance device according to claim 1 comprising an insulating capacitance in series with a surface capacitance in the semiconductor body, characterized in that the charges in the insulating layer are stored in such a matter that the combined capacitance varies linearly with the voltage applied over the semiconductor body and the insulating layer within the range of operation.

9. Capacitance device as claimed in claim 8 characterized in that a resistive layer is provided on the insulating layer, said resistive layer being connected to two opposite metal layers, adapted for the application of voltages, the resistive layer serving for allowing the application of different voltages over different portions of the insulating layer between the semiconductor body and the resistive layer.

* * * * *

UNITED STATES PATENT OFFICE

CERTIFICATE OF CORRECTION

Patent No. 3,638,078 Dated January 25, 1973

Inventor(s) John Torkel Wallmark

It is certified that error appears in the above-identified patent and that said Letters Patent are hereby corrected as shown below:

On the title page, in item [22] "Oct. 16, 1970" should read -- Nov. 16, 1970 --.

Signed and sealed this 19th day of November 1974.

(SEAL)
Attest:

McCOY M. GIBSON JR.
Attesting Officer

C. MARSHALL DANN
Commissioner of Patents